United States Patent [19]
Faigle et al.

[11] Patent Number: 5,762,368
[45] Date of Patent: Jun. 9, 1998

[54] INITIATOR FOR AIR BAG INFLATOR

[75] Inventors: Ernst M. Faigle. Dryden; Tracy S. Sparks. Lapeer; Richard J. Thompson. Imlay City, all of Mich.

[73] Assignee: TRW Vehicle Safety Systems Inc., Lyndhrust. Ohio

[21] Appl. No.: 665,675

[22] Filed: Jun. 20, 1996

[51] Int. Cl.⁶ .................................................. B60R 21/26
[52] U.S. Cl. ........................... 280/737; 280/741; 222/3; 102/531
[58] Field of Search .................................... 280/737, 736, 280/741, 742, 740; 137/68.13; 222/3; 102/530, 531

[56] References Cited

U.S. PATENT DOCUMENTS

| | | | |
|---|---|---|---|
| 3,806,153 | 4/1974 | Johnson | 280/737 |
| 3,884,497 | 5/1975 | Massengill et al. | 280/737 |
| 3,897,962 | 8/1975 | Sack | 280/736 |
| 3,951,428 | 4/1976 | Sugiura et al. | 280/737 |
| 3,961,806 | 6/1976 | Katter | 280/737 |
| 3,985,375 | 10/1976 | Lewis et al. | 280/737 |
| 4,050,483 | 9/1977 | Bishop | 280/737 |
| 4,131,300 | 12/1978 | Radke et al. | 280/737 |
| 5,031,932 | 7/1991 | Frantom et al. | 280/741 |
| 5,033,772 | 7/1991 | Frantom et al. | 280/737 |
| 5,378,018 | 1/1995 | Ketterer et al. | 280/737 |
| 5,487,559 | 1/1996 | Headley | 280/737 |
| 5,582,426 | 12/1996 | O'Loughlin et al. | 280/737 |
| 5,615,912 | 4/1997 | O'Loughlin et al. | 280/737 |

*Primary Examiner*—Peter C. English
*Attorney, Agent, or Firm*—Tarolli, Sundheim, Covell, Tummino & Szabo

[57] ABSTRACT

An apparatus (20, 220) for inflating an inflatable vehicle occupant protection device comprises a first container (22, 222) defining a first chamber (24, 224) for inflation fluid. The first container (22, 222) has an opening (26, 226) through which inflation fluid may flow to inflate the protection device. A rupturable closure (28, 228) extends across the opening (26, 226) in the first container (22, 222) to block fluid flow through the opening. A second container (68, 268) defines a second chamber (70, 270). A plate (82, 282) is located between the first chamber (24, 224) and the second chamber (70, 270) and has a passage (84, 84a, 284 or 284a) which allows fluid communication between the first and second chambers. A rupturable membrane (86, 286) extends across the passage (84, 84a, 284, or 284a) in the plate (82, 282) to restrict fluid communication between the first chamber (24, 224) and the second chamber (70, 270) and has an orifice (100, 300) to allow limited fluid communication between the first and second chambers. Ignitable material (80, 280) is located in the second chamber (70, 270) and produces combustion products (P), upon ignition, which increase pressure in the second chamber to a predetermined pressure to rupture the membrane (86, 286) and open the passage (84, 84a, 284, 284a) in the plate (82, 282) for the combustion products to flow into the first chamber (24, 224) and effect heating of inflation fluid (F).

20 Claims, 6 Drawing Sheets

INITIATOR FOR AIR BAG INFLATOR

BACKGROUND OF THE INVENTION

1. Technical Field

The present invention relates to an inflator for inflating an inflatable vehicle occupant protection device, such as an air bag. In particular, the present invention relates to an electrically actuatable initiator for the inflator.

2. Description of the Prior Art

Inflators for inflating inflatable vehicle occupant protection devices, such as air bags, are known. One known inflator includes a container for storing gas under pressure, an ignitable pyrotechnic material and an actuatable squib. The pyrotechnic material is typically sealed from the gas stored in the container. The squib is actuated to ignite the pyrotechnic material. Combustion products produced by ignition of the pyrotechnic material are typically released into the gas stored in the container. The combustion products heat the gas in the container to increase the pressure of the gas in the container. The pressurized gas is released from the container and is directed from the inflator to inflate the air bag.

SUMMARY OF THE INVENTION

The present invention is directed to an apparatus for inflating an inflatable vehicle occupant protection device. The apparatus comprises a first container defining a first chamber for inflation fluid. The first container has an opening through which inflation fluid flows to inflate the protection device. A rupturable closure blocks flow through the opening in the first container. A second container defines a second chamber. A plate is located between the first and second chambers. The plate has a plurality of passages extending through the plate.

A rupturable membrane extends across the plurality of passages in the plate to restrict fluid communication between the first and second chambers through the passages. The membrane has an orifice to allow limited fluid communication between the first and second chambers. Ignitable material is located in the second chamber and is exposed initially to the pressure at which the inflation fluid is stored. The ignitable material, upon ignition, produces combustion products which increase the pressure in the second chamber to rupture the membrane. The combustion products then flow from the second chamber into the first chamber through the plurality of passages to effect heating and further pressurization of the inflation fluid.

The ignitable material preferably comprises a non-metallic nitrogen containing compound which produces fuel-rich combustion products. The inflation fluid preferably comprises a mixture of gases including oxygen which supports burning of fuel-rich combustion products in the first chamber to further heat and pressurize the inflation fluid. The ignitable material burns more efficiently when exposed to elevated pressure in the second chamber which is even greater than the initial pressure at which the inflation fluid is stored. Before rupturing, the membrane retains a majority of the fuel-rich combustion products in the second chamber. The pressure in the second chamber thus increases before the membrane ruptures to enable the ignitable material to burn more efficiently.

The second container is preferably tubular and has a longitudinal central axis. The plate is fixed to one end of the second container. The second container is attached to the first container so the one end of the second container and the plate are located within the first container. The membrane comprises a metal member which is adhered to the plate. The membrane is located between the plate and the ignitable material.

The apparatus further includes actuatable means in the second chamber for igniting the ignitable material. The actuatable means may be located at an end of the second container opposite the plate. Upon actuation, the actuatable means directs initiating combustion products into the ignitable material in the second chamber in a direction towards the membrane. The actuatable means may alternately be located at a side of the second container. Upon actuation, the actuatable means directs initiating combustion products into the ignitable material in the second chamber in a direction transverse to the longitudinal central axis of the second container.

BRIEF DESCRIPTION OF THE DRAWINGS

The foregoing and other features and advantages of the present invention will become apparent to one skilled in the art to which the present invention relates upon reading the following description with reference to the accompanying drawings, in which.

DESCRIPTION OF PREFERRED EMBODIMENTS

An inflatable occupant protection system for a vehicle includes an inflatable vehicle occupant protection device, such as an air bag (not shown). An inflator 20 (FIG. 1), constructed according to one embodiment of the present invention, is actuatable to inflate the air bag. The air bag and the inflator 20 are mounted to a vehicle part, such as a seat, a door, an instrument panel or a steering wheel. The inflator 20 is actuated in response to a condition of the vehicle being detected, such as a collision having a severity greater than a predetermined severity or a deceleration above a predetermined deceleration, for which inflation of the air bag is desired. The air bag inflates to a position between a vehicle occupant and the vehicle part to help protect the occupant from forcibly striking or being struck by the vehicle part.

The inflator 20 includes a cylindrical metal container 22 with a longitudinal central axis A. The container 22 defines a chamber 24 for storing an inflation fluid, such as a gas mixture, under pressure. A circular opening 26 is located in the left end of the container 22, as viewed in FIG. 1. Gas from the chamber 24 flows through the opening 26 and is directed away from the inflator 20 to inflate the air bag.

Figure 1:
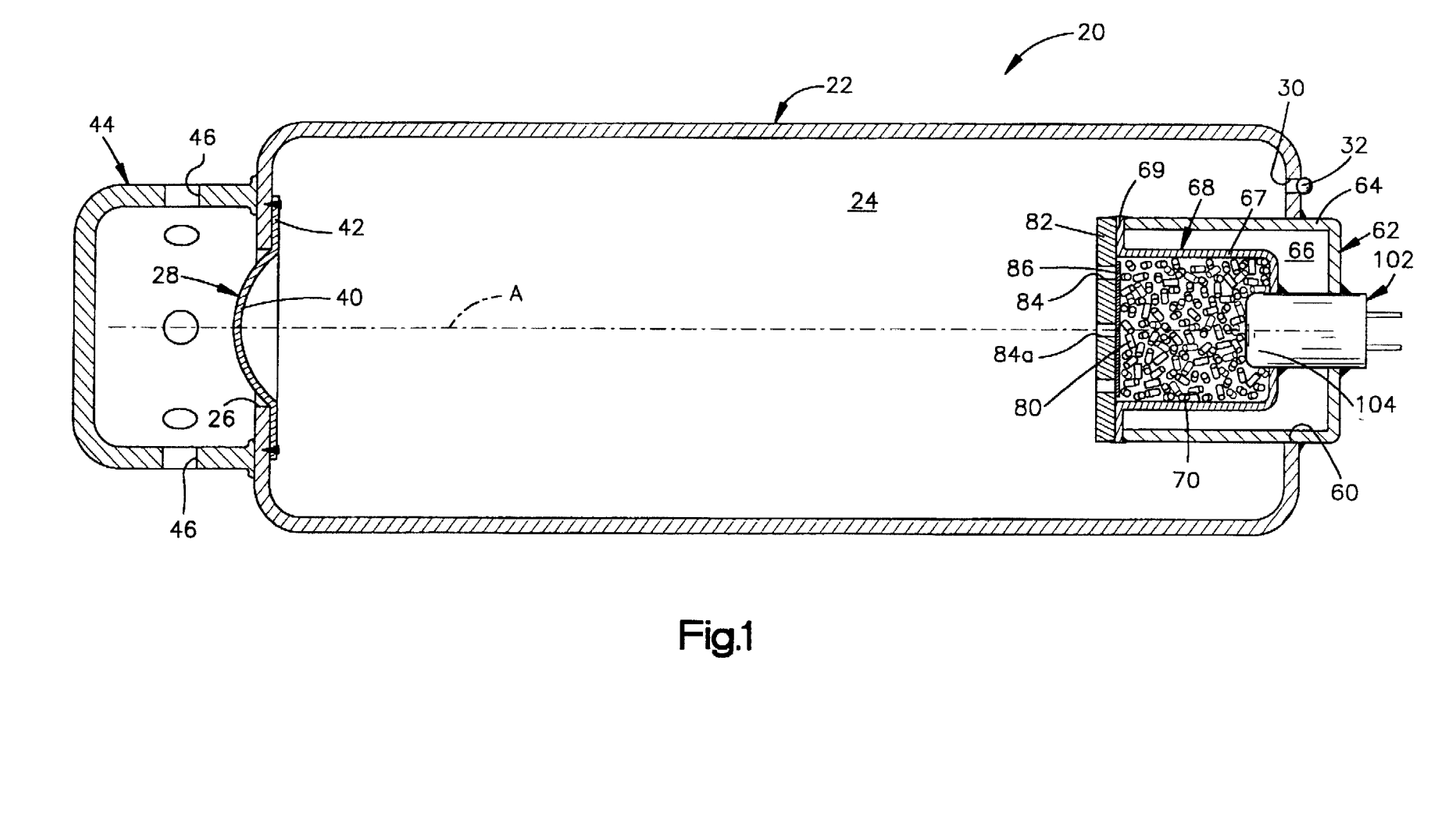
FIG. 1 is a schematic sectional view of an inflator constructed according to one embodiment of the present invention.

A rupturable metal closure 28 extends across the opening 26 and is attached to the container 22. The closure 28 blocks flow through the opening 26 in the container 22 when the closure is unruptured. The closure 28 has a concave central portion 40 and an edge portion 42 which extends radially outward from the central portion. The edge portion 42 of the closure 28 is attached to the container 22 by a continuous circumferential weld which surrounds the opening 26. The closure 28 has sufficient strength to withstand the pressure of the gas in the chamber 24, including any rise in pressure due to naturally occurring increasing temperature of the environment which surrounds the inflator 20. The closure 28 ruptures in response to pressure in the chamber 24 increasing to a predetermined pressure from the pressure at which the gas mixture is stored. Other closure means such as a frangible glass seal could also be used.

The pressure at which the gas mixture in the chamber 24 is stored may vary but is typically in the range of about 3,000 psi to about 4,500 psi at room temperature. The gas mixture comprises at least one inert gas and at least one oxidizer gas. The preferred inert gas is helium, argon, or a mixture of helium and argon in any proportion. The preferred oxidizer gas is oxygen and is the only gas present in the gas mixture other than the inert gas. In other words, there is no fuel in the gas mixture. When utilizing argon alone as the inert gas, the volume ratio of argon to oxygen is preferably about 3:1 to about 8:1.

The container 22 includes a fill port 30. The fill port 30 permits the chamber 24 to be filled with the gas mixture from a source. A spherical member 32 is welded to the container 22 to seal the fill port 30 after the chamber 24 is filled with the gas mixture.

Figure 3:
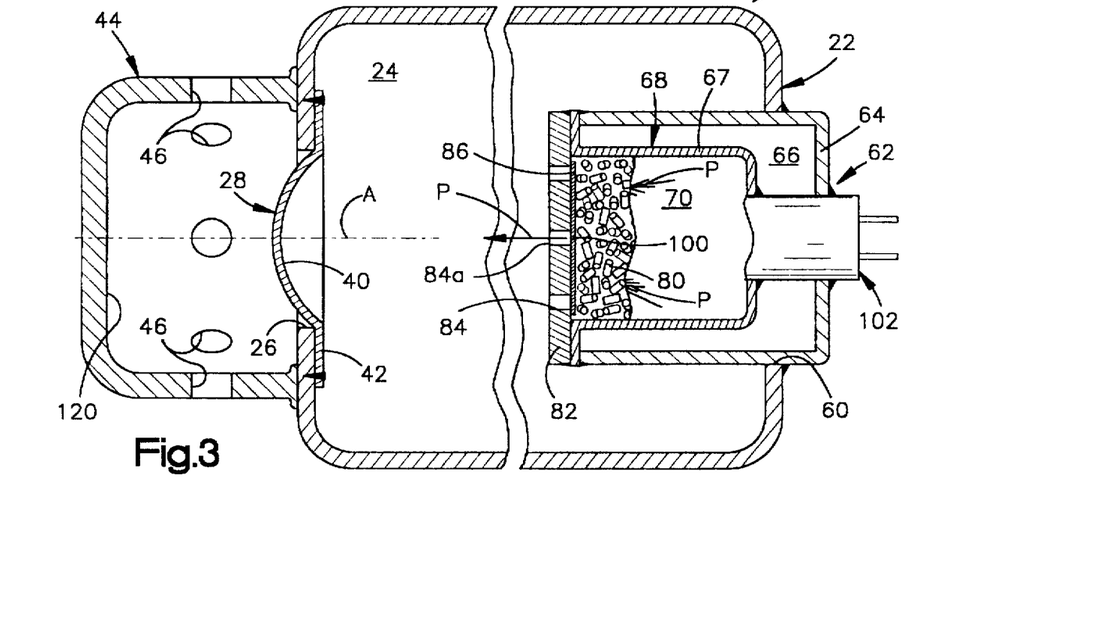
FIGS. 3 and 4 are enlarged views of opposite end portions of the inflator of FIG. 1, illustrating parts in different conditions.

A diffuser 44 is connected to the left end of the container 22, as viewed in FIGS. 1 and 3, and surrounds the opening 26. The diffuser 44 includes a plurality of outlet passages 46. The outlet passages 46 direct gas from the diffuser 44 in opposite radial directions to inflate the air bag. It will be apparent that the diffuser 44 could be formed in one piece with the container 22.

Figure 2:
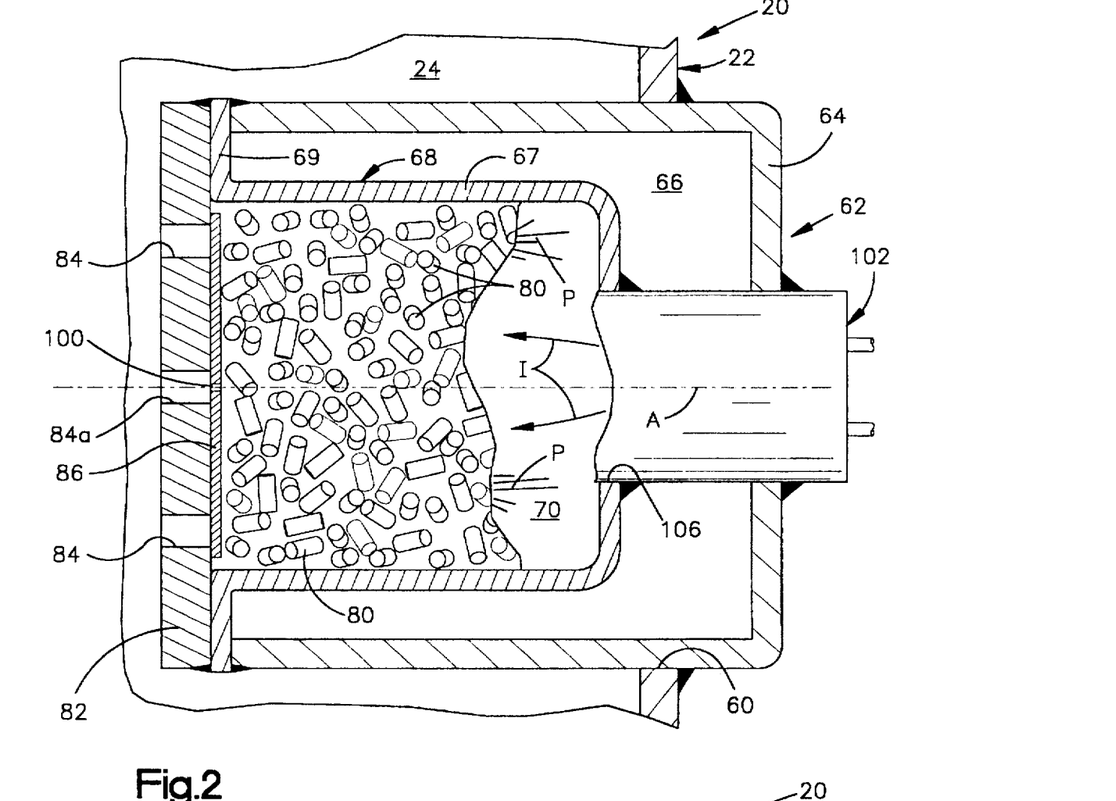
FIG. 2 is an enlarged view of an end portion of the inflator of FIG. 1.

In its right end, as viewed in FIGS. 1-3, the container 22 has an opening 60. An initiator assembly 62 (FIG. 2) extends through the opening 60 in the container 22 and into the chamber 24. The initiator assembly 62 includes a metal housing 64 which has a longitudinal central axis located coaxially with the axis A of the container 22. The housing 64 is welded to the container 22 by a continuous weld which extends around the opening 60 to hermetically seal the chamber 24 from the environment surrounding the inflator 20. The housing 64 defines a chamber 66 located coaxially along the axis A.

The initiator assembly 62 also includes a metal inner container 68 located inside of the housing 64. The inner container 68 has an end portion defined by a flange 69 which extends radially outward from a tubular portion 67. The flange 69 is welded to an end of the housing 64, to the left as viewed in FIG. 2. The flange 69 of the inner container 68 is thus located within the container 22. The tubular portion 67 of the inner container 68 is spaced radially inward from the housing 64. The inner container 68 defines a chamber 70 for ignitable material 80.

A metal cap plate 82 is located between the chamber 24 and the chamber 70. The cap plate 82 is welded to the flange 69 of the inner container 68 and is thus located within the container 22. A plurality of passages 84, 84a with substantially equal flow areas extend through the cap plate 82 to allow fluid communication between the chamber 24 and the chamber 70. The passage 84a is located centrally in the cap plate 82 and along the axis A of the container 22.

A rupturable membrane 86 is located between the ignitable material 80 and the cap plate 82. The membrane 86 is made from a relatively thin metal member and has an adhesive material applied to one of its side surfaces. The adhesive attaches the membrane 86 to the cap plate 82. The membrane 86 extends across all of the passages 84, 84a in the cap plate 82 to restrict fluid communication between the chamber 24 and the chamber 70 when the membrane is not ruptured.

The membrane 86 has an orifice 100 aligned with the passage 84a in the cap plate 82 to allow limited fluid communication between the chamber 24 and the chamber 70. The flow area of the orifice 100 is relatively smaller, and preferably is considerably smaller, than the flow area of the passage 84a. The limited fluid communication between the chamber 24 and the chamber 70 permits gas pressure which acts on opposite sides of the membrane 86, particularly during filling of the chamber 24, to equalize. The membrane 86 thus does not detach from the cap plate 82 and is not damaged or ruptured, as the chamber 24 is filled with the gas mixture. The membrane 86 ruptures to uncover all the passages 84, 84a when pressure in the chamber 70 reaches a pressure greater than the pressure in the chamber 24 by a predetermined difference.

The ignitable material 80 in the chamber 70 is preferably a "LOVA" (low vulnerability ammunition) based type of ignitable material. The LOVA based ignitable material 80 is relatively stable and relatively insensitive to unintentional ignition. The ignitable material 80 may be provided in any suitable form and is illustrated in FIGS. 1–4 as a plurality of small cylindrical pellets or grains. The ignitable material 80, upon ignition, produces fuel-rich combustion products P (FIG. 3) in the chamber 70.

The LOVA based ignitable material 80 preferably comprises a non-metallic nitrogen containing compound. The non-metallic nitrogen containing compound is a material capable of undergoing rapid and substantially complete transformation into the fuel-rich combustion products P. The preferred non-metallic nitrogen containing compound is a smokeless powder such as is used in the manufacture of explosives and ammunition. The non-metallic nitrogen containing compound is sufficiently effective in producing the fuel-rich combustion products P so that the only fuel needed in the inflator 20 is the LOVA based ignitable material 80.

The non-metallic nitrogen containing compound is preferably a material selected from the group consisting of nitroguanadine, triaminoguanadinenitrate, ethylene dinitramine, ethylenediamine dinitrate, 1, 3, 3-trinitroazetidine, cyclotrimethylenetrinitramine, cyclotetramethylenetetranitramine, trinitrotoluene, 2, 4, 6-trinitrophenylmethylnitramine and pentaerythritol tetranitrate and mixtures thereof. Preferably, the non-metallic nitrogen containing compound is cyclotrimethylenetrinitramine.

The LOVA based ignitable material 80 may also comprise a binder material which is mixed with the non-metallic nitrogen containing compound to obtain a moldable or extrudable plastic mass. Suitable binder materials include materials such as polyether polyester compounds. A particularly useful binder material for use with cyclotrimethylenetrinitramine is Hytrel® which is available from E.I. DuPont de Nemours & Company. Other binder materials which may be used with the quantity of the non-metallic nitrogen containing compound include cellulose based binders. The proportion of the non-metallic nitrogen containing compound to the binder, by weight, is preferably in the range of about 5:1 to about 20:1.

The non-metallic nitrogen containing compound may be mixed with a plasticizer in addition to the binder. Any plasticizer typically employed in the manufacture of low vulnerability ammunition may be used. When a plasticizer is used, it is desirable to maintain a weight ratio of the non-metallic nitrogen containing compound to the plasticizer in the range of about 5:1 to about 20:1. A preferred weight ratio of the non-metallic nitrogen containing compound to the binder and to the plasticizer is about 8:1:1.

The housing 64 (FIG. 2) and inner container 68 support an igniter 102 along the axis A of the container 22 at an end of the inner container opposite the cap plate 82. The igniter 102 is connected with a sensor (not shown) which detects a condition of the vehicle, such as a deceleration indicative of a collision. The igniter 102 has a cylindrical configuration and extends through the housing 64 into the chamber 66. The igniter 102 has an end portion 104 (FIG. 1) which extends through an opening 106 (FIG. 2) in the end of the inner container 68 and which is located in the chamber 70. The igniter 102 is welded at least to the inner container 68 with a continuous circumferential weld. The igniter 102 includes a suitable pyrotechnic charge such as zirconium potassium perchlorate ($ZrKClO_4$) or boron potassium nitrate ($BKNO_3$).

Figure 4:
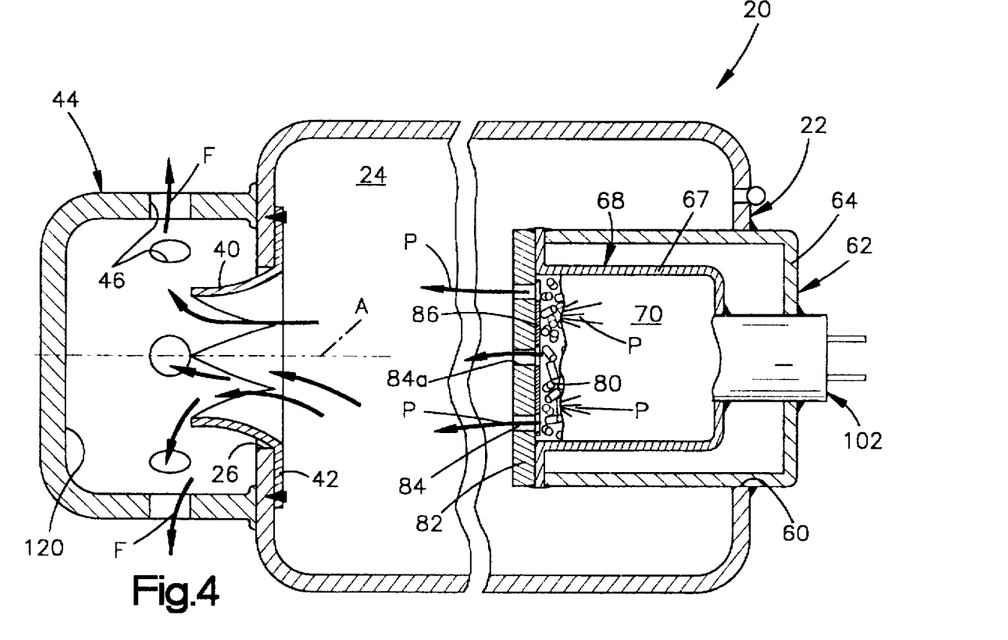

In operation, when a vehicle deceleration above the predetermined deceleration is detected, indicating a collision for which inflation of the air bag is desired, a switch in the sensor closes to complete an electrical circuit with a power source. Electrical energy is provided to actuate the igniter 102. The pyrotechnic charge in the igniter 102 ignites to produce initiating combustion products I. The initiating combustion products I are directed from the end portion 104 of the igniter 102 into the chamber 70 in a direction towards the membrane 86 and end cap 82, as illustrated in FIG. 2. The initiating combustion products I ignite the LOVA based ignitable material 80 in the chamber 70 to produce the fuel-rich combustion products P (FIGS. 2–4).

Pressure in the chamber 70 increases as a result of the fuel-rich combustion products P being produced by combustion of the ignitable material 80. Some fuel-rich combustion products P flow from the chamber 70 through the orifice 100 in the membrane 86 and the central passage 84a in the cap plate 82, as illustrated in FIG. 3. However, the membrane 86 holds most of the fuel-rich combustion products P in the chamber 70. Pressure in the chamber 70 increases to a pressure which is greater than the pressure in the chamber 24 by the predetermined difference. The relatively larger pressure acting on the side of the membrane 86 facing into the chamber 70 causes the membrane to rupture at several locations, as illustrated in FIG. 4, and completely open all of the passages 84, 84a in the cap plate 82.

The LOVA based ignitable material 80 tends to burn more efficiently and with fewer unwanted by-products when exposed to elevated pressure. Initially, the LOVA based ignitable material 80 is exposed to the pressure in the chambers 24, 70 at which the gas mixture is stored. Upon burning of the ignitable material 80, the membrane 86 retains a majority of the fuel-rich combustion products in the chamber 70 before the membrane ruptures. The pressure in the chamber 70 increases and enables the ignitable material 80 to burn more efficiently than at relatively lower pressures. The pressure in the chamber 70 increases to a pressure greater than the pressure in the chamber 24 by the predetermined difference of about 2,000 psi before the membrane 86 ruptures.

When the membrane 86 ruptures, fuel-rich combustion products P flow from the chamber 70 through all of the passages 84, 84a in the cap plate 82 and are directed into the chamber 24. The oxidizer gas in the gas mixture supports combustion of the fuel-rich combustion products P in the chamber 24. The inert gas and any unconsumed portion of the oxidizer gas in the chamber 24 are heated by combustion of the fuel-rich combustion products P. Pressure in the chamber 24 increases. The increasing pressure in the chamber 24 applies a force against the closure 28 to rupture the central portion 40 of the closure 28, as illustrated in FIG. 4, when the predetermined pressure is reached.

Inflation fluid F which comprises the inert gas, unconsumed oxidizer gas and unburned fuel-rich combustion products P flows from the chamber 24 through the opening 26. When inflation fluid F enters the diffuser 44, it impinges against an end wall 120 of the diffuser. The end wall 120 of the diffuser 44 directs the flow of inflation fluid F radially outward toward the outlet passages 46 in the diffuser 44. The inflation fluid F then flows from the diffuser 44 through the outlet passages 46 to inflate the air bag.

Figure 5:
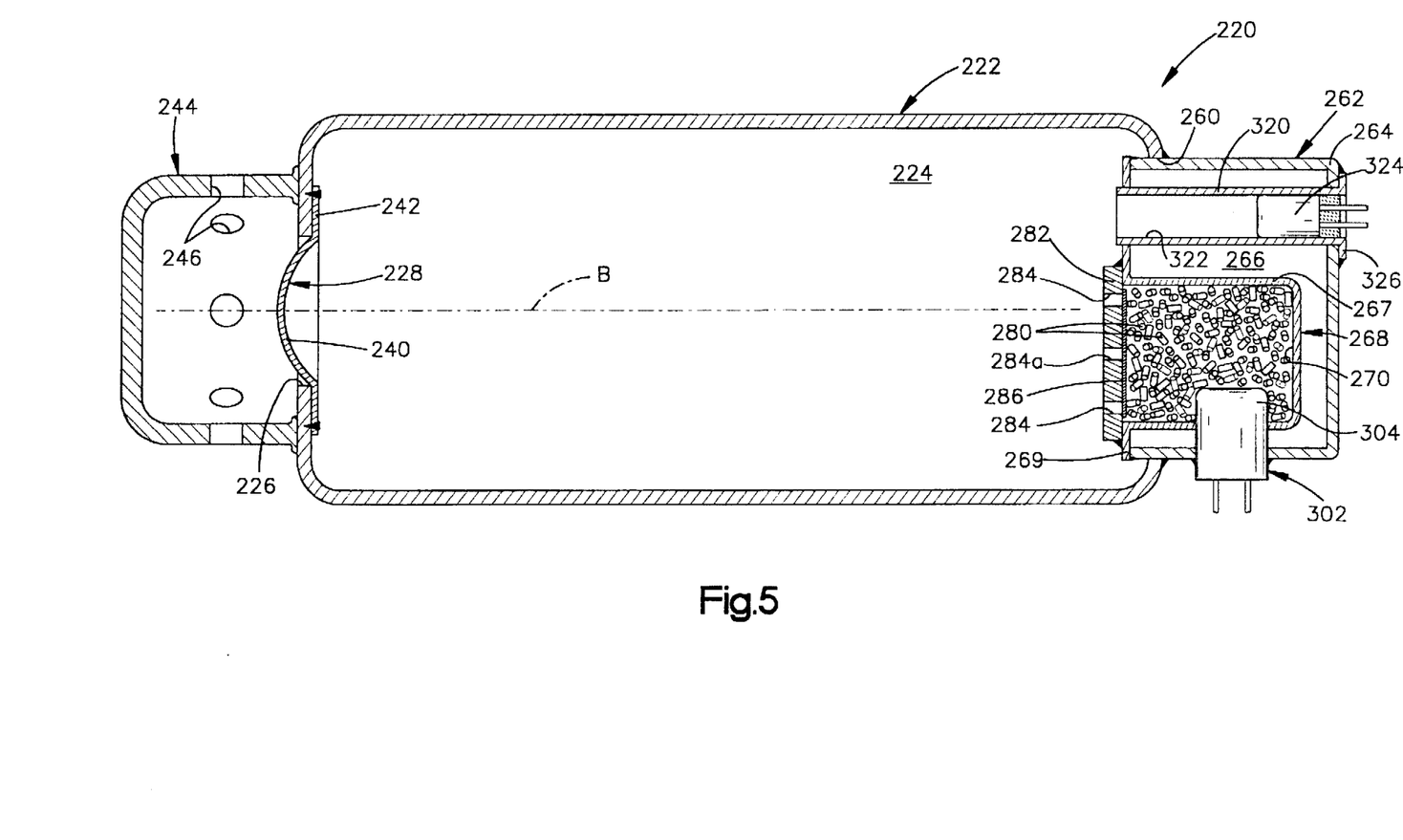
FIG. 5 is a schematic sectional view of an inflator constructed according to another embodiment of the present invention.

An inflator 220, constructed according to another embodiment of the present invention, is illustrated in FIG. 5. The inflator 220 is actuatable to inflate an air bag (not shown). The inflator 220 is similar in structure and operation to the inflator 20, illustrated in FIGS. 1–4 and described above.

The inflator 220 includes a metal cylindrical container 222 with a longitudinal central axis B. The container 222 defines a chamber 224 for storing an inflation fluid, such as a gas mixture, under pressure. The composition of the gas mixture stored in the chamber 224 is identical to the gas mixture stored in the chamber 24 of the inflator 20 described above. The pressure of the gas mixture in the container 222 may vary but is typically in the range of about 3,000 psi to about 4,500 psi at room temperature.

The container 222 has a circular opening 226 in the left end, as viewed in FIG. 5, through which gas may flow to inflate the air bag. The opening 226 in the container 222 is closed by a rupturable metal closure 228. The closure 228 has a concave central portion 240 and an edge portion 242 extending radially outward from the central portion. The edge portion 242 of the closure 228 is welded to the left end of the container 222, as viewed in FIG. 5, by a continuous circumferential weld which surrounds the opening 226. The closure 228 ruptures in response to pressure in the chamber 224 increasing to a predetermined pressure.

The closure 228 may be scored along the concave portion 240 to define a plurality of radially extending weakened portions. The radially extending weakened portions define pie-shaped pieces of the concave portion 240. The closure 228 ruptures along the weakened portions and the pie-shaped pieces remain connected to the edge portion 242 of the closure.

A diffuser 244 is connected to the left end of the container 222 and surrounds the opening 226. The diffuser 244 includes a plurality of outlet passages 246 for gas to flow through after the closure 228 ruptures. The diffuser 244 directs gas flowing through the opening 226 in opposite radially outward directions.

Figure 6:
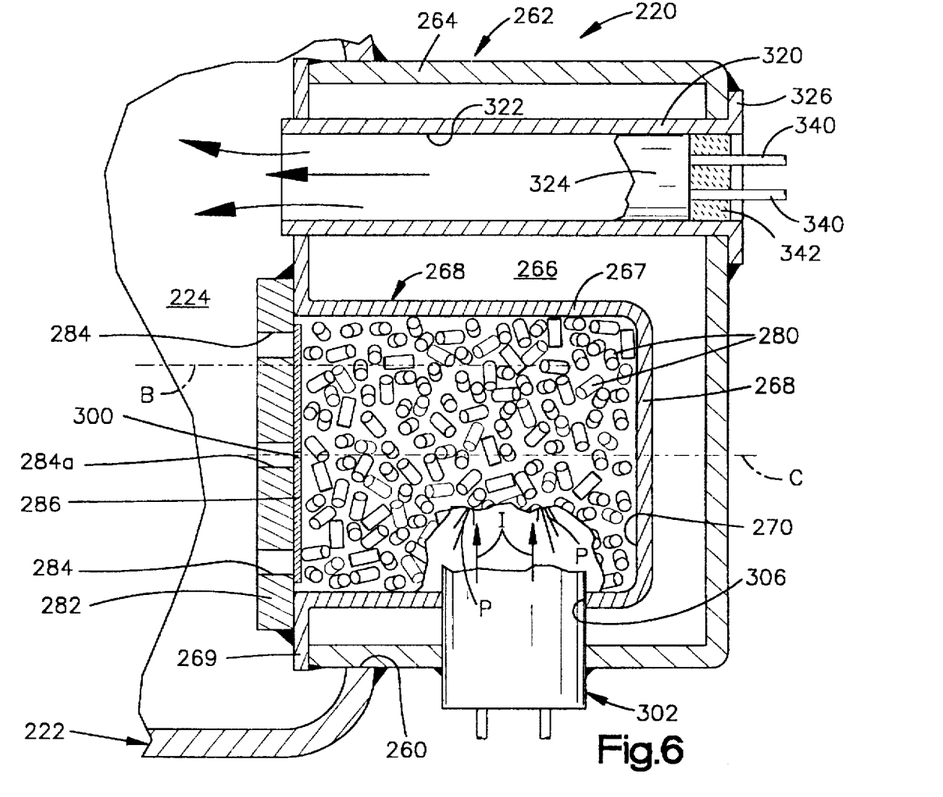
FIG. 6 is an enlarged view of an end portion of the inflator of FIG. 5, illustrating parts in different conditions.

The container 222 also has an opening 260 in the right end, as viewed in FIGS. 5 and 6. An initiator assembly 262 (FIG. 6) extends through the opening 260 in the container 222 and into the chamber 224. The initiator assembly 262 includes a metal housing 264 which is welded to the container 222 around the opening 260. The housing 264 defines a chamber 266.

The initiator assembly 262 also includes a metal inner container 268 inside the chamber 266 of the housing 264.

The inner container 268 defines a chamber 270 and has a longitudinal central axis C that is spaced radially from the axis B of the container 222. Ignitable material 280 is located in the chamber 270. The ignitable material 280 is identical to the ignitable material 80, illustrated in FIGS. 1–4 and described above.

The inner container 268 includes a tubular portion 267 and a flange 269 extending radially outward from the tubular portion. The flange 269 is welded to an end of the outer housing 264. The tubular portion 267 of the inner container 268 is spaced from the housing 264.

A metal cap plate 282 is welded to the flange 269 of the inner container 268. A plurality of passages 284, 284a extend through the cap plate 282 to allow fluid communication between the chamber 224 and the chamber 270. The passage 284a is located centrally in the cap plate 282 and along the axis C of the inner container 268.

A relatively thin and rupturable metal membrane 286 is attached to the cap plate 282 by an adhesive. The membrane 286 extends across all of the passages 284, 284a in the cap plate 282 to restrict fluid communication between the chamber 224 and the chamber 270 when the membrane is unruptured. The membrane 286 has an orifice 300 (FIG. 6) aligned with the central passage 284a in the cap plate 282 to permit a limited amount of fluid communication between the chamber 224 and the chamber 270. The membrane 286 ruptures to uncover completely all the passages 284, 284a when the membrane is exposed to pressure in the chamber 270 which is greater than the pressure in the chamber 224 by a predetermined difference.

The ignitable material 280 tends to burn more efficiently when exposed to elevated pressure. The ignitable material 280 initially is exposed to the pressure at which the gas mixture is stored in the chambers 224, 270. When the ignitable material 280 begins to burn, the membrane 286 retains additional pressure in the chamber 270. When the pressure in the chamber 270 increases to a pressure which is greater than the pressure in the chamber 224 by the predetermined difference, forces acting on the membrane 286 rupture the membrane.

The housing 264 and inner container 268 support an igniter 302 such that the igniter extends in a direction perpendicular to the axis C of the inner container 268 and chamber 270. The igniter 302 has a cylindrical configuration and extends through the housing 264 into the chamber 266. The igniter 302 is welded to the housing 264. The igniter 302 has an end portion 304 (FIG. 5) which extends through an opening 306 (FIG. 6) in the tubular portion 267 of the inner container 268 and into the chamber 270. The igniter 302 fits tightly within the opening 306 in the inner container 268. The igniter 302 includes a pyrotechnic charge. The igniter could extend axially into the container 268.

The initiator assembly 262 also includes a metal tube 320 which is spaced radially from the axis B of the container 222 and from the axis C of the inner container 268. The tube 320 defines a passage 322 which is in fluid communication with the chamber 224. A flange 326 extends radially outward from one end of the tube 320 and is welded to the housing 264. A shock wave generator 324 is located in the passage 322. The shock wave generator 324 may be an igniter of any suitable construction. Leads 340 conduct actuating electrical energy to the shock wave generator 324.

A seal 342 attaches the shock wave generator 324 to the tube 320. The seal 342 blocks fluid leakage between the shock wave generator 324 and the tube 320. The seal 342 is a glass-like ceramic material which seals around and bonds to an inner surface of the tube 320, the leads 340 and an end surface of the shock wave generator 324. The seal 342 also electrically insulates the leads 340 from each other and from the tube 320. The seal 342 completely spans the passage 322 in the tube 320. Alternately, the initiator assembly 262 could be machined from solid bar stock creating containers as previously described.

Figure 7:
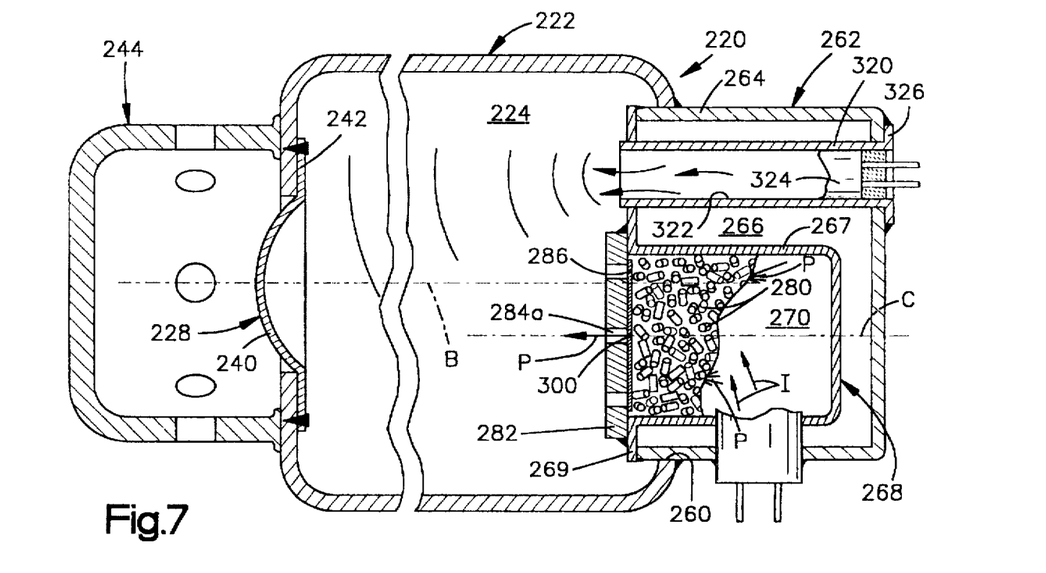
FIGS. 7–9 are enlarged views of opposite end portions of the inflator of FIG. 5, illustrating parts in different conditions.
Figure 8:
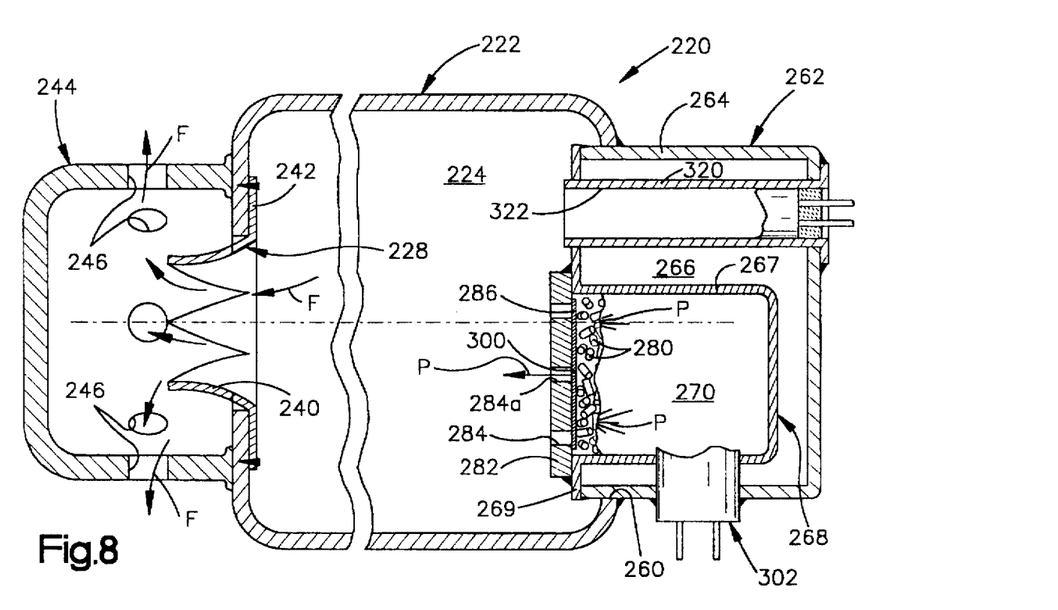

In operation, when a vehicle deceleration above the predetermined deceleration is detected, indicating a collision for which inflation of the air bag is desired, a switch in a sensor completes an electrical circuit to actuate the shock wave generator 324, as illustrated in FIG. 6. Actuation of the shock wave generator 324 produces a shock wave in the gas mixture stored in the chamber 224. The shock wave propagates through the gas mixture toward the closure 228, as illustrated in FIG. 7. The force of the shock wave striking the closure 228 ruptures the closure along the weakened portions to start the release of inflation fluid F from the chamber 224, as illustrated in FIG. 8. The inflation fluid F flows through the opening 226 and into the diffuser 244. The inflation fluid then flows radially through the outlet passages 246 in the diffuser 244 to start inflation of the air bag.

The switch in the sensor also completes another electrical circuit to actuate the igniter 302. Actuation of the igniter 302 may occur concurrently with, before or after actuation of the shock wave generator 324. Actuation of the igniter 302 ignites the pyrotechnic charge in the igniter 302. Burning of the pyrotechnic charge in the igniter 302 generates initiating combustion products I (FIG. 6) which are released into the chamber 270. The initiating combustion products I are directed into the chamber 270 in a direction normal to the axis C of the inner container 268. Directing the initiating combustion products I transverse to the axis C minimizes the possibility that pressure of the initiating combustion products I will compress the ignitable material 280 or force the ignitable material through the membrane 286 and the passages 284, 284a.

Figure 9:
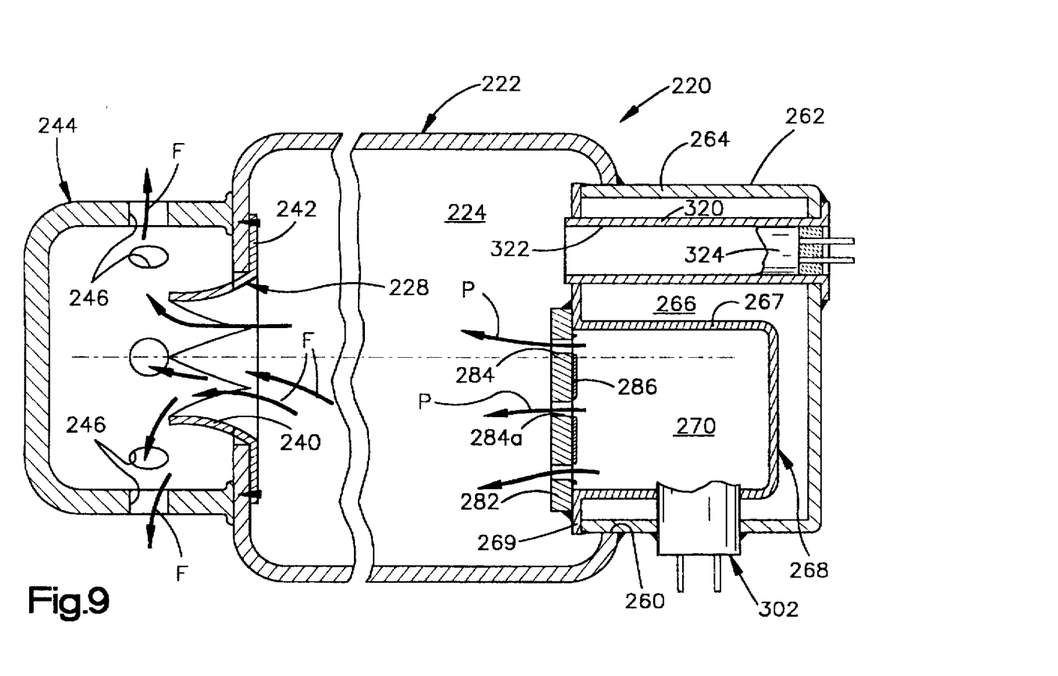

The initiating combustion products I in the chamber 270 ignite the ignitable material 280 to produce fuel-rich combustion products P (FIGS. 6–8). Some of the fuel-rich combustion products P flow from the chamber 270 through the orifice 300 in the membrane 286, as illustrated in FIGS. 7 and 8. The rest of the fuel-rich combustion products P are held in the chamber 270. The pressure in the chamber 270 increases until the membrane 286 ruptures, as illustrated in FIG. 9, and completely uncovers the passages 284, 284a. Rupturing the membrane 286 allows the fuel-rich combustion products P to flow through the passages 284, 284a in the cap plate 282.

The fuel-rich combustion products P are directed into the chamber 224. The oxidizer gas in the gas mixture supports combustion of the fuel-rich combustion products P in the chamber 224 to generate heat. Inflation fluid F comprising the inert gas, unconsumed oxidizer gas and unburned fuel-rich combustion products P in the chamber 224 is heated to be further pressurized gas. The pressurized inflation fluid F flows through the opening 226 in the container 222 and into the diffuser 244. The inflation fluid F is then directed from the diffuser 244 through the outlet passages 246 to inflate the air bag.

From the above description of the invention, those skilled in the art will perceive improvements, changes and modifications. Further, although the inflatable occupant protection device is described above as an air bag, it could also be an inflatable seat belt, an inflatable head liner, or a knee bolster which is actuated by an air bag. Such improvements, changes and modifications within the skill of the art are intended to be covered by the appended claims.

Having described the invention, the following is claimed:

1. An apparatus for inflating an inflatable vehicle occupant protection device, said apparatus comprising:
   a first container defining a first chamber for inflation fluid, said first container having an opening through which inflation fluid flows to inflate the protection device;
   a rupturable closure extending across the opening in said first container to block fluid flow through the opening;
   a second container defining a second chamber for communication with the first chamber;
   a plate located between the first and second chambers, said plate having at least one passage, having a first diameter, which allows fluid communication between the first and second chambers;
   a rupturable membrane having a first portion extending across the passage in said plate to restrict fluid communication between the first and second chambers, the first portion of said membrane having an orifice to allow limited fluid communication between the first and second chambers, the orifice being aligned with the passage and having a second diameter which is smaller than the first diameter; and,
   ignitable material in the second chamber for, upon ignition, producing combustion products which increase the pressure in the second chamber to rupture said membrane and open the passage in said plate for combustion products to flow into the first chamber and effect heating of the inflation fluid.

2. The apparatus of claim 1 wherein said ignitable material comprises low vulnerability ammunition material.

3. The apparatus of claim 1 wherein said closure ruptures in response to pressure in the first chamber increasing to a predetermined pressure.

4. The apparatus of claim 1 further including actuatable means for igniting said ignitable material in the second chamber.

5. The apparatus of claim 4 wherein said second container is tubular and has a longitudinal central axis, said igniting means being disposed to direct initiating combustion products into said ignitable material in a direction transverse to the longitudinal central axis of said second container.

6. The apparatus of claim 1 wherein said plate is fixed to an end portion of said second container and wherein said plate and said end portion of said second container are located within said first container.

7. The apparatus of claim 1 wherein said membrane comprises a metal member adhered to said plate, said membrane located between said plate and said ignitable material.

8. The apparatus of claim 1 wherein said plate has a plurality of passages, in addition to the one passage, which provide fluid communication between the first and second chambers, said membrane having a plurality of second portions, each of the second portions of said membrane extending across a respective one of the plurality of passages and blocking fluid communication between the first and second chambers through the respective one of the plurality of passages, said membrane rupturing at each of the plurality of passages when the pressure in the second chamber reaches a predetermined level to open each of the plurality of passages.

9. An apparatus for inflating an inflatable vehicle occupant protection device, said apparatus comprising:
   first means defining a first chamber for inflation fluid, said first means having an opening through which inflation fluid flows to inflate the protection device;
   second means defining a second chamber;
   a plate located between the first and second chambers, said plate having a passage, having a first diameter, which allows fluid communication between the first and second chambers;
   a rupturable membrane extending across the passage in said plate to restrict fluid communication between the first and second chambers and having an orifice to allow limited fluid communication between the first and second chambers, the orifice being aligned with the passage and having a second diameter which is smaller than the first diameter; and
   ignitable material in the second chamber for, upon ignition, producing combustion products which increase the pressure in the second chamber to rupture said membrane and open the passage in said plate for combustion products to flow into the first chamber and heat inflation fluid.

10. The apparatus of claim 9 wherein said ignitable material comprises low vulnerability ammunition material.

11. The apparatus of claim 9 further including first actuatable means for igniting said ignitable material in the second chamber.

12. The apparatus of claim 11 wherein said second means comprises a tubular container which has a longitudinal central axis, said igniting means disposed to direct initiating combustion products into said ignitable material in a direction transverse to the longitudinal central axis of said tubular container.

13. An apparatus for inflating an inflatable vehicle occupant protection device, said apparatus comprising:
   a first container defining a first chamber for storing a gas mixture under pressure, said gas mixture including an oxidizer gas, said first container having an opening through which gas flows to inflate the protection device;
   a rupturable closure extending across the opening in said first container to block fluid flow through the opening;
   a second container defining a second chamber for communication with the first chamber;
   a plate located between the first and second chambers, said plate having a plurality of passages which allow communication between the first and second chambers;
   a rupturable membrane extending across said plurality of passages in said plate for restricting communication between the first and second chambers, said membrane having an orifice for allowing limited communication between the first and second chambers; and
   ignitable material in the second chamber for producing, upon ignition, fuel-rich combustion products to rupture said membrane and open said plurality of passages in said plate for the fuel-rich combustion products to flow into the first chamber, combustion of said fuel-rich combustion products in the first chamber being supported by said oxidizer gas to heat and pressurize the gas mixture in the first chamber.

14. The apparatus of claim 13 wherein said membrane ruptures in response to pressure in the second chamber increasing to a predetermined pressure.

15. The apparatus of claim 13 further including actuatable means in the second chamber for igniting said ignitable material.

16. The apparatus of claim 15 wherein said second container has a longitudinal central axis, said igniting means disposed to direct initiating combustion products into said ignitable material in a direction transverse to the longitudinal central axis of said second container.

17. An apparatus for inflating an inflatable vehicle occupant protection device, said apparatus comprising:

a first container defining a first chamber for inflation fluid, said first container having an opening through which inflation fluid flows to inflate the protection device;

a rupturable closure extending across the opening in said first container to block fluid flow through the opening;

a second container defining a second chamber for communication with the first chamber;

a plate located between the first and second chambers, said plate having a passage which allows fluid communication between the first and second chambers;

a rupturable membrane extending across the passage in said plate to restrict fluid communication between the first and second chambers, said membrane having an orifice to allow limited fluid communication between the first and second chambers; and, ignitable material in the second chamber for, upon ignition, producing combustion products which increase the pressure in the second chamber to rupture said membrane and open the passage in said plate for combustion products to flow into the first chamber and effect heating of the inflation fluid, wherein said ignitable material comprises a non-metallic nitrogen containing compound for, upon ignition, producing fuel-rich combustion products, and further including an oxidizer in the first chamber for supporting combustion of said fuel-rich combustion products.

18. An apparatus for inflating an inflatable vehicle occupant protection device, said apparatus comprising:

first means defining a first chamber for inflation fluid, said first means having an opening through which inflation fluid flows to inflate the protection device;

second means defining a second chamber;

a plate located between the first and second chambers, said plate having a passage which allows fluid communication between the first and second chambers;

a rupturable membrane extending across the passage in said plate to restrict fluid communication between the first and second chambers and having an orifice to allow limited fluid communication between the first and second chambers; and ignitable material in the second chamber for, upon ignition, producing combustion products which increase the pressure in the second chamber to rupture said membrane and open the passage in said plate for combustion products to flow into the first chamber and heat inflation fluid, wherein said ignitable material comprises a non-metallic nitrogen containing compound for, upon ignition, producing fuel-rich combustion products, and further including an oxidizer in the first chamber which supports combustion of the fuel-rich combustion products in the first chamber.

19. An apparatus for inflating an inflatable vehicle occupant protection device, said apparatus comprising:

first means defining a first chamber for inflation fluid, said first means having an opening through which inflation fluid flows to inflate the protection device;

second means defining a second chamber;

a plate located between the first and second chambers, said plate having a passage which allows fluid communication between the first and second chambers;

a rupturable membrane extending across the passage in said plate to restrict fluid communication between the first and second chambers and having an orifice to allow limited fluid communication between the first and second chambers; and ignitable material in the second chamber for, upon ignition, producing combustion products which increase the pressure in the second chamber to rupture said membrane and open the passage in said plate for combustion products to flow into the first chamber and heat inflation fluid, further including first actuatable means for igniting said ignitable material in the second chamber, further including a rupturable closure extending across the opening in said first means to block flow through the opening and second actuatable means for producing a shock wave which propagates through inflation fluid in the first chamber to rupture said closure.

20. The apparatus of claim 19 wherein said first and second actuatable means are actuated at different times.

* * * * *